United States Patent [19]
Motoyama

[11] Patent Number: 4,837,623
[45] Date of Patent: Jun. 6, 1989

[54] TELEVISION INTERRUPT CIRCUIT

[75] Inventor: Tsutomu Motoyama, Knoxville, Tenn.

[73] Assignee: North American Philips Corporation, New York, N.Y.

[21] Appl. No.: 134,340

[22] Filed: Dec. 17, 1987

[51] Int. Cl.4 ............................................. H04N 5/222
[52] U.S. Cl. ................................... 358/165; 358/160; 358/198
[58] Field of Search ..................... 358/33, 36, 37, 160, 358/165, 166, 167, 198, 196

[56] References Cited
U.S. PATENT DOCUMENTS

| | | | |
|---|---|---|---|
| 2,912,490 | 11/1959 | Parker . | |
| 3,619,492 | 11/1971 | Avans | 178/5.8 R |
| 4,280,139 | 7/1981 | Mogi et al. | 358/165 |
| 4,398,220 | 8/1983 | Satoh | 358/198 |
| 4,554,584 | 11/1985 | Elam et al. | 358/165 |
| 4,568,979 | 2/1986 | Takagi | 358/165 |
| 4,577,226 | 3/1986 | Avins | 358/198 |
| 4,605,964 | 8/1986 | Chard | 358/165 |
| 4,607,390 | 8/1986 | Faugeron | 455/143 |

Primary Examiner—James J. Groody
Assistant Examiner—Michael D. Parker
Attorney, Agent, or Firm—Marianne R. Rich

[57] ABSTRACT

An interrupt circuit monitors a television audio demodulator or an external video input circuit and interrupts the video signal to CRT and the audio signal to television speaker(s) whenever a lost signal condition is detected. In the preferred embodiment, a lost signal condition is detected by monitoring the voltage level of the signal from the audio demodulator or the external video input circuit and generating a detect signal whenever the voltage exceeds a predetermined threshold. When a television signal is lost, both the audio demodulator signal and the external video signal constitute a noise signal that has a voltage amplitude that is greater than the normal operating range of either of these two signals. In the preferred embodiment, when a detect signal is produced, both the video signal to the CRT and the audio signal to the television speaker(s) are interrupted and alternate video and audio signals are provided to the CRT and speaker(s) by a microprocessor. These alternate signals will announce the lost signal condition to the viewer.

23 Claims, 1 Drawing Sheet

TELEVISION INTERRUPT CIRCUIT

FIELD OF INVENTION

The present invention relates to interrupt circuitry and particularly relates to a television interrupt circuit that interrupts the video and audio signals of the television when the input signal to the television is lost.

BACKGROUND OF INVENTION

When a television input signal is lost, most televisions will display a noisy bright picture on the cathode ray tube and will broadcast noise over the television speaker(s). Also, the design of most television audio demodulators will cause them to produce a noise signal, with an amplitude that is substantially greater than the voltage amplitude of the normal audio signal produced when a valid television input signal is present. This design characteristic of the demodulators and amplifiers causes the production of annoying video pictures and audio broadcasts when a television signal is lost. A similar phenomenon occurs when a television is receiving its input signal from a video cassette recorder (VCR). When the end of a recorded program on the VCR tape is reached, the VCR will produce a video signal based on the blank tape. Again, because of the video amplifier design, the video signal produced by the VCR based on blank tape will have an amplitude substantially greater than the amplitude of the video signal under normally operating conditions when a recorded television program is present on the tape. This condition will produce an annoying picture of noise on the television.

SUMMARY OF INVENTION

The present invention eliminates the annoying video display and audio broadcast when the television input signal is lost. In this context, it will be understood that the meaning of "a lost signal" includes a totally absent television signal such as when a television antenna input cable is disconnected from the television, a weak television broadcast signal that falls below a predetermined power level and a VCR signal when playing a blank tape, such as when the VCR reaches the end of a recorded program on a tape. Essentially, a television signal is "lost" whenever the television audio or video signals become noise with a voltage amplitude greater than the normal range of the audio or video signals when a valid television signal is present.

When a television is receiving a signal through its RF input, which is usually a cable signal or a television antenna signal, it is preferred in the present invention to monitor the audio signal in order to determine the lost signal condition since the audio demodulator produces the most dramatic change when a signal is lost. As used herein, the term audio demodulator will be understood to include the usual limiting amplifier circuitry and discriminator which is responsive to frequency difference between the modulated carrier signal and the unmodulated carrier signal.

When a television is receiving a signal from a VCR, it is preferred to monitor the video signal from the VCR since the VCR's may have an audio mute feature that is actuated by a user and this mute feature would interfere with the determination of a lost signal condition. Some VCR's include a video mute function that in a sense will defeat the operation of the present invention. However, if the VCR video signal is muted, it is not necessary for further muting of the signal by the television receiver. Stated differently, if the VCR mutes the video signal, the circuit of the present invention does not need to work.

In accordance with the present invention, the output of the television audio demodulator/amplifier or the signal appearing on the television video input circuit is monitored and a detect signal is produced whenever a lost signal condition is determined. In the preferred embodiment, a lost signal condition is determined whenever the monitored signal is noise having an amplitude greater than and beyond the voltage amplitude range of the video or the audio signal when the television is operating normally.

In the preferred embodiment, the apparatus of the present invention is used in a television having an audio demodulator for producing at its output an electrical audio signal normally corresponding to a television sound program. The television also includes a video input circuit for receiving an input signal normally corresponding to a television video program, a cathode ray tube for producing a video picture and an audio speaker for producing television sound. A switch is connected at one input to the demodulator and at a second input to the video input circuit. The switch may be actuated between two positions to selectively apply one of the signals at its two inputs to the output of the switch. A detector is connected to the output of the switch for detecting the presence of noise and producing a detect signal. In response to the detect signal, a picture disable circuit interrupts the video signal to the CRT and a sound disable circuit interrupts the audio signal to the speaker.

Again, in the preferred embodiment, the noise detector is a comparator that has a reference signal and is operable to produce the detect signal when a magnitude of the signal at the switch output is greater than the reference signal. Such noise detector preferably includes a high pass filter connected to the output of the switch for filtering DC components and producing a filtered signal. A rectifier produces a substantially DC voltage in response to the filtered signal and the circuit is devised to provide a reference voltage that constitutes the reference signal. A trigger is responsive to the substantially DC voltage for producing the detect signal when the substantially DC voltage exceeds the reference voltage in magnitude. A bi-polor transistor is used as a switch as part of the trigger and the base-emitter voltage is used as a reference voltage.

The sound and picture disable circuits in one form of the invention simply blank the picture and mute the sound whenever the detect signal is present. However, in another form of the invention, a microprocessor is provided to produce an alternate audio and video signal whenever the detect signal is present. In this form, the disable circuits interrupt the normal audio and video signals and alternate audio and video signals are provided to the speaker and cathode ray tube. These alternate signals aurally and visually announce the lost signal condition.

BRIEF DESCRIPTION OF THE DRAWINGS

The present invention may best be understood by reference to the following Detailed Description of a preferred embodiment when considered in conjunction with the Drawings in which.

DETAILED DESCRIPTION

Figure 1:
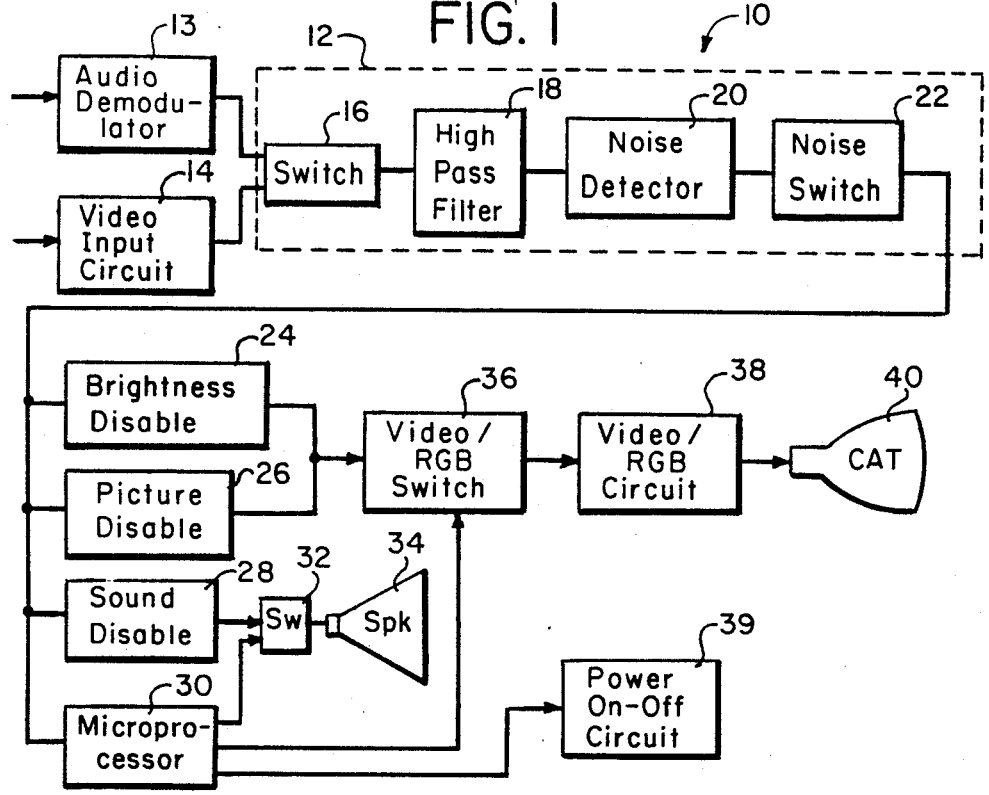
FIG. 1 is a block diagram of the interrupt circuit incorporated into a television.

Referring now to the drawings in which like reference characters designate like or corresponding parts in the two views, a block diagram 10 is shown in FIG. 1 in which an interrupt circuit 12 is incorporated into a television. A conventional television includes an audio demodulator 13 and a video input circuit 14 for receiving a video signal from a device such as a VCR. A sound carrier signal is applied to the audio demodulator 13 and an audio signal is produced at its output corresponding to the sound program of the television signal. A video signal (not an RF signal) such as from a VCR is normally applied to the video input circuit 14. The outputs of both the audio demodulator 13 and the video input circuit 14 are applied as inputs to a switch 16 that is operable to apply one of its inputs to the output of the switch. The switch 16 is operated by the television user and is used to switch between two inputs. For example, the switch is normally used to switch between the audio carrier signal produced from the RF input of a television on which a cable signal or an antenna signal is applied, and the VCR video inputs of the television. The video input circuit 14 would be a part of the television inputs designed to receive VCR signals that are not RF signals.

The output of the switch 16 is applied to a high pass filter 18 that functions to eliminate any DC components from the signal appearing at the switch output and it produces a filtered DC signal. The output of the high pass filter 18 is applied to a noise detector 20 whose output is applied to the noise switch 22. The noise detector 20 is operable to detect noise at the output of the high pass filter 18 and, thus, to detect a lost television signal condition. When detector 20 determines that a lost signal condition exists, noise switch 22 produces a detect signal at its output which is applied to a brightness disable circuit 24, a picture disable circuit 26, a sound disable circuit 28 and a microprocessor 30. The brightness disable circuit and the picture disable circuit produce disable signals that are applied to a video/RGB (red, green, blue) switch 36 that is operable in response to the disable signal to interrupt the video signal that is normally applied through the video/RGB switch 36 and through a video/RGB circuit 38 to a cathode ray tube 40 of the television. When the disable signal is applied to the switch 36, in one form of the invention, a blank signal is provided so that the cathode ray tube 40 is simply blank or turned off when the disable signal is present. In another form of the invention, a microprocessor 30 is provided and it produces an alternate video signal in response to the detect signal of switch 22. This alternate video signal is applied from the microprocessor 30 to the video/RGB switch 36 and then through the video/RGB circuit 38 to the cathode ray tube 40 to visually announce the lost carrier condition. For example, the alternate video signal could supply a picture to the CRT 40 that was blank except for a written message stating that the television input signal has been lost.

In the preferred embodiment the detect signal from noise switch 22 also initiates a timing program in microprocessor 30 that times the presences of the detect signal. After the detect signal has been present for fifteen minutes, the microprocessor 30 applies a signal and actuates a power ON/OFF circuit 39 that turns the television power off. This function also constitutes a manner of interrupting the video or audio signal, and it is understood that the timing period may vary from zero to any reasonable period of time (on the order of hours).

The detect signal of switch 22 is also operable to actuate sound disable circuit 28 to produce a disable signal that is applied to switch 32. When the disable signal is applied to switch 32, the audio signal that would be applied to speaker 34 under normal operating conditions is interrupted, and in the preferred embodiment, microprocessor 30 produces an alternate audio signal. This alternate audio signal is applied through switch 32 to the speaker 34 when the disable signal is present at switch 32, and it causes an aural announcement of the lost signal condition. For example, the alternate audio signal could be a low volume, repetitive chiming sound or a tone.

When a television is accidentally left on and the television signal is lost, the present invention will blank the screen and provide a small visual message and will substantially reduce or eliminate the sound produced by the television. In this manner, the television will not produce annoying pictures and sound broadcasts of noise and it will use less electrical power when the television signal is lost.

Figure 2:
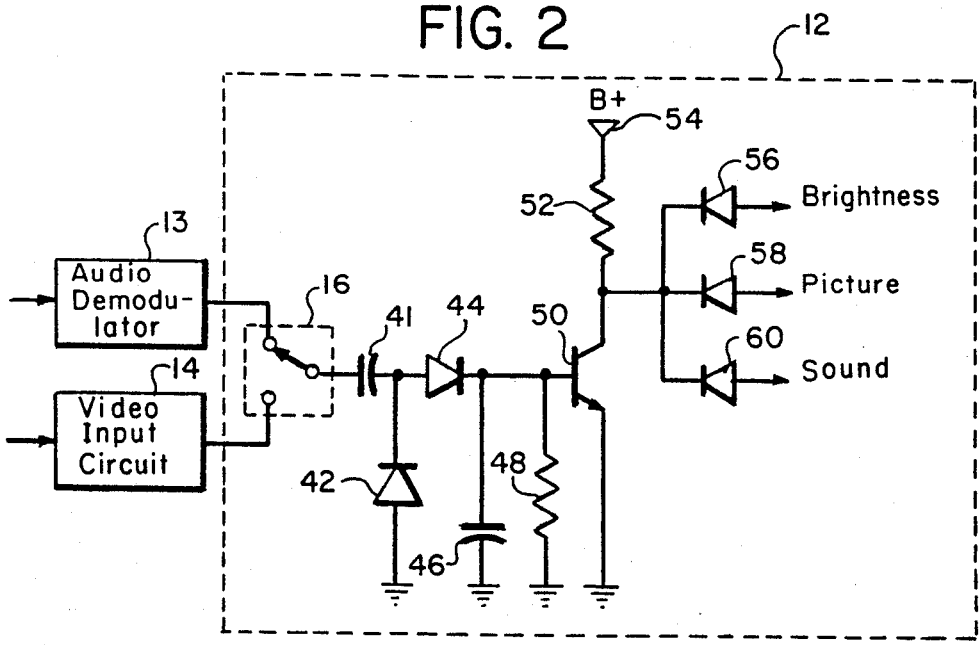
FIG. 2 is a schematic diagram of the interrupt circuit.

Referring now to FIG. 2, there is shown a schematic diagram of the interrupt circuit 12 shown connected to demodulator 13 and input circuit 14. As shown in FIG. 2, a switch 16 is used to switch the input of the interrupt circuit 12 between the audio demodulator 13 and the video input circuit 14. This switch is already provided in many televisions for switching between a broadcast signal and a local VCR video signal. In the present invention it is preferred to monitor the output of the audio demodulator 13 when a signal through a tuner input is being utilized by the television since the audio signal shows a very dramatic change (increase in voltage amplitude) when the tuner signal is lost. However, when the television is receiving an input video signal from a local source, such as a VCR, it is preferred to use the signal appearing at the video input circuit 14 of the television as the input signal for the interrupt circuit 12 to avoid problems associated with mute functions on the audio output of many VCR's.

The output of the switch 16 is connected to a capacitor 41 that functions as the high pass filter 18 shown in FIG. 1 to eliminate DC components that may appear at the output of the switch 16. A diode 42 is connected between ground and the output of the capacitor 41, and is biased from the ground toward the output of capacitor 41. A diode 44 is also connected to the output of capacitor 41 and is biased away from capacitor 41, and a capacitor 46 and a resistor 48 are connected in parallel between the output of diode 44 and ground. In this configuration the diodes 42 and 44 and the capacitor 46 function as a rectifier to produce a substantially DC voltage at the output of the diode 44. The resistor 48 provides a load for the rectifier and a DC voltage appears across resistor 48.

A bi-polar transistor 50 is provided with its base connected to the output of th ediode 44, its emitter connected to ground, and its collector connected through a load resistor 52 to a DC power source 54. In this configuration, the transistor 50 will saturate and turn on whenever the base to emitter voltage, the voltage appearing at the output of diode 44, exceeds approximately 0.6 volts. Under normal operating conditions when a proper television signal is being received, the voltage appearing at the output of diode 44, the base of transistor 50 will be less than 0.6 volts and the transistor will not be on. This is true regardless of whether the switch 16 is connected to the demodulator 13 or the input circuit 14. Under normal operating conditions, neither the video signal or the audio signal will produce a sufficient voltage at the base of transistor 50 to turn it "on". During the "off" condition only a small current due to trans-conductance flows through transistor 50 which is insufficient to forward bias diodes 56, 58 and 60. However, when the television signal is lost, a noise signal is applied to the input of switch 16 and the voltage increases at the base of the transistor 50 and exceeds the base emitter voltage of 0.6 volts. Thus, a noise signal will turn transistor 50 on and a relatively large current will flow compared to the off condition from the power source 54 through the resistor 52 and the transistor 50 and such current is sufficient to forward bias diodes 56, 58 and 60.

The collector of transistor 50 is connected to diodes 56, 58 and 60, and when the transistor 50 turns on, the collector of transistor 50 and each of the diodes 56, 58 and 60 are connected to ground. When the transistor 50 is off, the collector of transistor 50 is maintained at the voltage of the power source 54 and, thus, the diodes 56, 58 and 60 are maintained in a reverse biased condition as long as the transistor 50 is off.

Referring to FIGS. 1 and 2, the noise detector 20 may be constituted of the rectifier consisting of diodes 42 and 44 and capacitor 46 and the load resistor 48 in combination with the base emitter portion of the transistor 50. The noise switch 22 corresponds to the transistor 50 in combination with the load resistor 52 and the diodes 56, 58 and 60. It will be appreciated that the detect signal produced by the noise switch 22 is, in fact, a ground signal that appears at the collector of transistor 50, and it will be understood that the disable circuits 24, 26 and 28 and the microprocessor 30 are responsive to the ground signal to perform their respective functions.

Although a particular embodiment has been described in the foregoing detailed description, it will be appreciated that the invention is capable of numerous rearrangements, modifications and substitution of parts without departing from the scope of the invention as defined in the appended claims.

I claim:

1. An apparatus for use in a television having an audio demodulator for producing at its output an electrical audio signal normally corresponding to a sound program in a television signal, a cathode ray tube for producing a video picture in response to a video signal and an audio speaker for producing television sound in response to the audio signal, comprising:

a detector for being connected to the output of the audio demodulator to receive the electrical audio signal and for producing a detect signal when the electrical audio signal does not correspond to a sound program; and disable means for interrupting at least a portion of the television signal that produces the video picture in response to the detect signal.

2. The apparatus of claim 1 wherein said disable means comprise:

picture disable means for interrupting the video signal to the cathode ray tube in response to the detect signal; and sound disable means for interrupting the audio signal to the speaker in response to the detect signal.

3. The apparatus of claim 2 further comprising:

a microprocessor for producing an alternate video signal in response to said detect signal; and means for transmitting said alternate video signal to the cathode ray tube for display.

4. The apparatus of claim 2 further comprising:

a microprocessor for producing an alternate sound signal in response to said detect signal; and means for transmitting said alternate sound signal to the speaker for broadcast.

5. The apparatus of claim 1 wherein said detector comprises a noise detector that is operable to detect noise at the output of the audio demodulator to thereby determine that the electrical audio signal does not correspond to a sound program and to produce the detect signal when noise is detected.

6. The apparatus of claim 1 wherein said audio signal has amplitudes within a predetermined range when a television sound program is received and has amplitudes greater, than the range when the television sound program is lost and wherein said detector comprises a comparator that has a reference signal and is operable to produce the detect signal when the amplitude of the electrical audio signal at the output of the audio demodulator is greater than the reference signal, said comparator producing the detect signal whenever the sound program is lost and the audio signal has amplitudes exceeding the predetermined range.

7. The apparatus of claim 5 wherein said noise detector comprises:

a high pass filter for being connected to the output of the audio demodulator and for filtering DC components from the electrical audio signal to produce a filtered signal;

a rectifier for producing a substantially DC voltage corresponding in magnitude to the filtered signal;

means for providing a reference voltage; and trigger means responsive to the substantially DC voltage for producing the detect signal when the substantially DC voltage exceeds the reference voltage in magnitude.

8. The apparatus of claim 7 wherein said detect signal is substantially a ground voltage.

9. An apparatus for use in a television having a video input circuit for receiving an input video signal normally corresponding to a video program in a television signal and for producing a second video signal corresponding to the input video signal, the second video signal being amplified with respect to the input video signal, being within a predetermined range of amplitudes when a valid input video signal is received and being amplified above the predetermined range when the input video signal of the television signal is lost, a cathode ray tube for producing a video picture in response to the second video signal and an audio speaker for producing television sound in response to an audio signal, comprising:

a detector for being connected to the video input circuit to receive the second video signal and for producing a detect signal in response to the second video signal exceeding the predetermined range when the input video signal is lost; and disable means for interrupting at least a portion of the television signal in response to the detect signal.

10. An apparatus for use in a television having a video circuit for receiving a video input signal normally corresponding to a video program in a television signal, a cathode ray tube for producing a video picture in response to a video signal and an audio speaker for producing television sound in response to an audio signal, comprising:

a detector for being connected to the video input circuit to receive the input signal and for producing a detect signal when the input signal does not correspond to a video program;

disable means for interrupting at least a portion of the television signal in response to the detect signal; and said detector comprising a noise detector that is operable to detect noise at the video input circuit to thereby determine that the input signal does not correspond to a video program and to produce the detect signal when the noise is detected.

11. The apparatus of claim 10 wherein said noise detector comprises a comparator that has a reference signal and is operable to produce the detect signal when magnitude of the input signal at the video input circuit is greater than the reference signal.

12. The apparatus of claim 10 wherein said noise detector comprises:

a high pass filter for being connected to receive the input signal of the video input circuit and for filtering DC components from the input signal to produce a filtered signal;

a rectifier for producing a substantially DC voltage corresponding in magnitude to the filtered signal;

means for providing a reference voltage; and trigger means responsive to the substantially DC voltage for producing the detect signal when the substantially DC voltage exceeds the reference voltage in magnitude.

13. The apparatus of claim 12 wherein said detect signal is a ground voltage.

14. The apparatus of claim 9 further comprising a microprocessor for producing an alternate television signal in response to said detect signal.

15. An apparatus for use in a television having an audio demodulator for producing at its output an electrical audio signal normally corresponding to a television sound program, a video input circuit for receiving an input signal normally corresponding to a television video program, a cathode ray tube for producing a video picture in response to a video signal and an audio speaker for producing television sound in response to the electrical audio signal, comprising:

a switch having a first input for being connected to receive the electrical audio signal of the audio demodulator, a second input for being connected to receive the input signal of the video input circuit and having an output, said switch being operable to selectively apply one of its input signals to its output;

a detector connected to the output of said switch for producing a detect signal when the signal at said output is not a valid audio or video signal;

picture disable means for interrupting the video signal to cathode ray tube in response to the detect signal; and sound disable means for interrupting the audio signal to speaker in response to the detect signal.

16. The apparatus of claim 15 wherein said detector comprises a noise detector that is operable to detect noise at the output of the switch.

17. The apparatus of claim 16 wherein said noise detector comprises a comparator that has a reference signal and is operable to produce a detect signal when the magnitude of the signal at the output of the switch is greater than the reference signal.

18. The apparatus of claim 16 wherein said noise detector comprises:

a high pass filter for being connected to the output of the switch for filtering DC components from the signal at the output of the switch to produce a filtered signal;

a rectifier for producing a substantially DC voltage in response to the filtered signal;

means for providing a reference voltage; and trigger means responsive to the substantially DC voltage for producing the detect signal when the substantially DC voltage exceeds the reference voltage in magnitude.

19. The apparatus of claim 18 wherein said detect signal is ground voltage.

20. The apparatus of claim 15 further comprising:

a microprocessor for producing an alternate video signal in response to said detect signal; and means for transmitting said alternate video signal to the cathode ray tube for display.

21. The apparatus of claim 15 further comprising:

a microprocessor for producing an alternate sound signal in response to said detect signal; and means for transmitting said alternate sound signal to the speaker for braodcast.

22. In a television apparatus having first means for producing an electrical audio signal normally corresponding to a sound program in a television signal, said audio signal exceeding a predetermined amplitude range when the sound program is lost, display means for producing a video picture in response to a video signal and speaker means for producing television sound in response to the audio signal, the improvement comprising:

detector means connected to said first means for receiving said electrical audio signal and for producing a detect signal in response to the audio signal exceeding the predetermined amplitude range when the sound program is lost and said electrical audio signal corresponds to a loss of the sound program; and disable means connected to receive said detect signal for interrupting at least a selected one of said video picture and said television sound in response to said detect signal.

23. An apparatus as set forth in claim 22, wherein said first means comprises audio demodulator means.

* * * * *

UNITED STATES PATENT AND TRADEMARK OFFICE
CERTIFICATE OF CORRECTION

PATENT NO. : 4,837,623

DATED : June 6, 1989

INVENTOR(S) : TSUTOMU MOTOYAMA

It is certified that error appears in the above—identified patent and that said Letters Patent is hereby corrected as shown below:

On the title page in the illustrative figure and Fig.1, box 40 label should read CRT.

Signed and Sealed this

Twenty-third Day of April, 1991

Attest:

HARRY F. MANBECK, JR.

Attesting Officer

Commissioner of Patents and Trademarks